US007675881B2

(12) United States Patent
Verma et al.

(10) Patent No.: US 7,675,881 B2
(45) Date of Patent: Mar. 9, 2010

(54) INTERFACING A WLAN WITH A MOBILE COMMUNICATIONS SYSTEM

(75) Inventors: Shaily Verma, Mumbai (IN); Charles Chuanming Wang, Jamison, PA (US)

(73) Assignee: Thomson Licensing, Issey les Moulineaux (FR)

(*) Notice: Subject to any disclaimer, the term of this patent is extended or adjusted under 35 U.S.C. 154(b) by 89 days.

(21) Appl. No.: 10/517,466

(22) PCT Filed: May 28, 2003

(86) PCT No.: PCT/US03/16714

§ 371 (c)(1),
(2), (4) Date: Dec. 6, 2004

(87) PCT Pub. No.: WO03/105380

PCT Pub. Date: Dec. 18, 2003

(65) Prior Publication Data

US 2005/0157673 A1    Jul. 21, 2005

Related U.S. Application Data

(60) Provisional application No. 60/386,319, filed on Jun. 6, 2002.

(51) Int. Cl.
*H04W 4/00* (2009.01)
*H04W 24/00* (2009.01)

(52) U.S. Cl. .................... 370/328; 370/331; 370/338; 370/352; 455/432.1; 455/436; 455/456.1

(58) Field of Classification Search ............... 370/338, 370/328, 352–356, 331; 455/432.1–433, 455/436, 438–439, 456.1, 456.5

See application file for complete search history.

(56) References Cited

U.S. PATENT DOCUMENTS

| 6,185,436 | B1 * | 2/2001 | Vu ........................... 455/558 |
| 6,275,706 | B1 * | 8/2001 | Rune ...................... 455/456.1 |
| 6,535,815 | B2 * | 3/2003 | Bloebaum ................. 701/213 |
| 6,542,516 | B1 | 4/2003 | Vialen et al. |

(Continued)

FOREIGN PATENT DOCUMENTS

EP    1146691    10/2001

(Continued)

OTHER PUBLICATIONS

Ala-Laurila, Juha, et al. Wireless LAN Access Network Architecture for Mobile Operators, IEEE Communications Magazine, Nov. 2001.

(Continued)

*Primary Examiner*—Simon D Nguyen
(74) *Attorney, Agent, or Firm*—Robert D. Shedd; Joseph J. Opalach; Catherine A. Cooper

(57) ABSTRACT

An interface for connecting networks includes an interworking function provided between a wireless local area network (WLAN) and a public mobile land network (PLMN) to provide communication interactions between the PLMN and the WLAN. The interworking function includes a dual-protocol stack, which interfaces the WLAN protocols and PLMN protocols to provide seamless communications between the WLAN and the PLMN such that an increase in available service bandwidth provided for users of the PLMN is maintained.

18 Claims, 3 Drawing Sheets

U.S. PATENT DOCUMENTS

| | | |
|---|---|---|
| 6,661,782 B1 * | 12/2003 | Mustajarvi et al. ........... 370/331 |
| 6,792,270 B1 * | 9/2004 | Neumann ................. 455/432.1 |
| 6,819,937 B2 * | 11/2004 | Knuutila et al. ............. 455/522 |
| 6,950,662 B2 * | 9/2005 | Kumar .................... 455/456.3 |
| 7,099,339 B1 | 8/2006 | Wang et al. |
| 2001/0046839 A1 | 11/2001 | Latva-Aho et al. |
| 2002/0085540 A1 * | 7/2002 | Hyvarinen et al. .......... 370/352 |
| 2002/0110104 A1 | 8/2002 | Surdila et al. |
| 2002/0136226 A1 * | 9/2002 | Christoffel et al. .......... 370/401 |
| 2003/0063581 A1 * | 4/2003 | Shanbhag et al. .......... 370/328 |
| 2003/0119481 A1 | 6/2003 | Haverinen et al. |
| 2003/0139180 A1 | 7/2003 | McIntosh et al. |
| 2003/0156566 A1 * | 8/2003 | Griswold et al. ............ 370/338 |
| 2004/0037269 A1 * | 2/2004 | Lundin ....................... 370/352 |
| 2004/0057424 A1 * | 3/2004 | Kokkonen .................. 370/352 |
| 2006/0291455 A1 * | 12/2006 | Katz et al. ................. 370/355 |

FOREIGN PATENT DOCUMENTS

| | | |
|---|---|---|
| EP | 161106 A2 | 12/2001 |
| JP | 2002541747 | 3/2002 |
| WO | WO 98/53576 | 11/1998 |
| WO | WO99/53668 | 10/1999 |
| WO | 0199466 A2 | 12/2001 |
| WO | WO02087160 A2 | 10/2002 |

OTHER PUBLICATIONS

Search Report Dated Oct. 23, 2003.

* cited by examiner

US 7,675,881 B2

INTERFACING A WLAN WITH A MOBILE COMMUNICATIONS SYSTEM

This application claims the benefit, under 35 U.S.C. § 365 of International Application PCT/US03/16714, filed May 28, 2003, which was published in accordance with PCT Article 21(2) on Dec. 18, 2003, 2003 in English and which claims the benefit of U.S. provisional patent application No. 60/386,319, filed June 6, 2002.

FIELD OF THE INVENTION

The present invention generally relates to network communications and, more particularly, to a method and system for interworking wireless local area networks (WLAN) with the UMTS (Universal Mobile Telecommunications System) network by making an Interworking Function in the WLAN appear to the UMTS network as a Serving GPRS (General Packet Radio Services) Support Node (SGSN).

BACKGROUND OF THE INVENTION

Universal Mobile Telecommunications System (UMTS) currently includes up to a 'third generation' (3G) mobile communications system developed within a framework known as IMT-2000 (International Mobile Telecommunications-2000). UMTS will play a key role in creating the mass market for high-quality wireless multimedia communications. UMTS will enable many wireless capabilities, delivering high-value broadband information, commerce and entertainment services to mobile users via fixed, wireless and satellite networks. UMTS will speed convergence between telecommunications, information technology, media and content industries to deliver new services and create revenue-generating services. Compared to its 2G or 2.5G wireless cellular counterpart, UMTS will deliver low-cost, high-capacity mobile communications with data rates on the order of 2 Mbit/sec under stationary conditions with global roaming and other advanced capabilities.

One drawback of the UMTS network is high cost of spectrum and low data rates as compared to WLANs (Wireless Local Area Networks). It is thus advantageous to complement UMTS with unlicensed band, high data rate WLANS such as IEEE 802.11 and ETSI Hiperlan2 to save UMTS radio resources and increase the efficiency of the UMTS RAN (Radio Access Network). Interworking may be provided between a WLAN hotspot and a radio access network such as UMTS to allow a user to utilize either the WLAN or the radio access technology, or both, depending on the location of the user. The interworking between the WLAN and the radio access technology may provide the user with roaming capability as the user moves between, and through, the coverage areas of the WLAN and the radio access technology in order to efficiently use the capabilities of the access networks.

Therefore, a need exists for a system and method, which utilizes WLAN bandwidth to supplement UMTS bandwidth to increase overall performance and efficiency. A further need exists for an architecture where the WLAN coverage area interacts with a UMTS network through an interworking function (IWF) that communicates with the UMTS Serving GPRS (General Packet Radio Services) Support Node (SGSN) as another SGSN over a Gn interface specified by the 3GPP standard body. Yet another need exists for a method for seamless interfacing of UMTS with WLANs through the use of interworking.

SUMMARY OF THE INVENTION

An interface for connecting networks includes an interworking function provided between a wireless local area network (WLAN) and a Public Mobile Land Network (PLMN) to provide communication interactions between the PLMN and the WLAN. The interworking function includes a dual-protocol stack, which interfaces the WLAN protocols and PLMN protocols to provide seamless communications between the WLAN and the PLMN such that an increase in available service bandwidth provided for users of the PLMN is maintained.

A method for interfacing two wireless networks includes connecting a wireless local area network (WLAN) to a Universal Mode Telecommunications System (UMTS) network through an intra-PLMN (Public Mobile Land Network) interface. The WLAN is interfaced to the UMTS network by providing an interface towards the UMTS and the WLAN and using an interworking function such that communications received from the WLAN appear to be from another Serving GPRS (General Packet Radio Services) Support Node (SGSN) and communications sent to the WLAN appear to be from within the WLAN.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention provides a method and system for utilizing available bandwidth in wireless/radio networks. An architecture is provided where the wireless local area network (WLAN) coverage area interacts with a universal mobile telecommunications system (UMTS) network as another Serving GPRS (General Packet Radio Services) Support Node (SGSN) through an intra-PLMN (Public Mobile Land Network) backbone.

A number of architectures are provided to interwork between the WLAN coverage area and other radio access technologies (RATs), such as UMTS. A novel approach is presented to assist in using any existing WLAN coverage area to complement UMTS networks by defining the WLAN's interworking function (IWF) as another SGSN. One advantage includes that QoS (quality of service) negotiation, mobility, and AAA (Authentication, Authorization and Accounting) procedures of the 3G network are re-used. Advantageously, the present invention can work with any system (e.g., General Packet Radio Service (GPRS)/code division multiple access (CDMA) 2000) that needs to interwork with WLANs.

It is to be understood that the present invention is described in terms of an illustrative WLAN-UMTS system architecture; however, the present invention is much broader and may include any wireless/radio network system(s), which are capable of providing telecommunication services. It should be understood that the elements shown in the FIGS. may be implemented in various forms of hardware, software or combinations thereof. Preferably, these elements are implemented in hardware on one or more appropriately programmed general-purpose devices, which may include a processor, memory and input/output interfaces.

Figure 1:
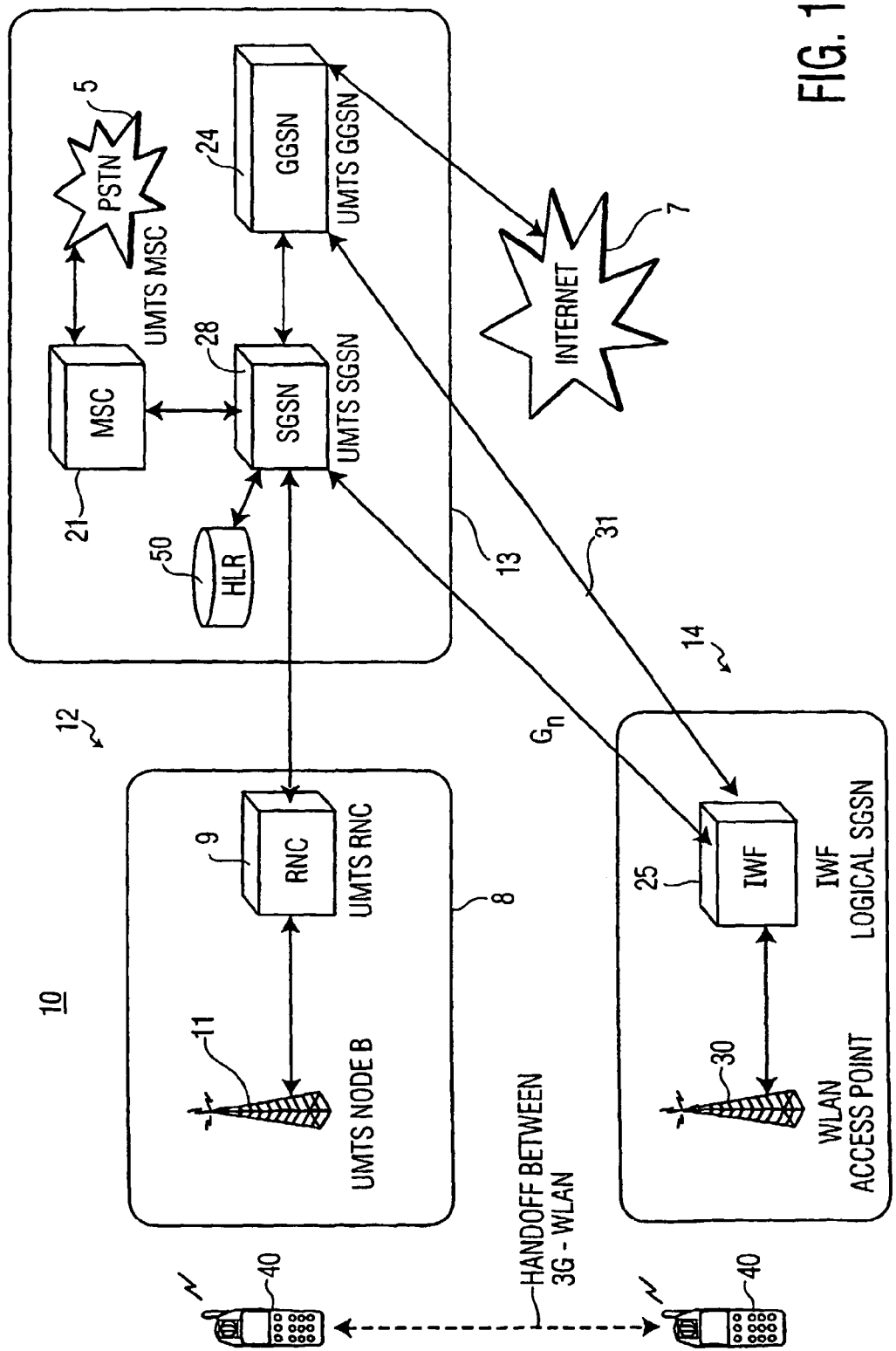
FIG. 1 is a schematic diagram of a system architecture having a WLAN interfaced to a UMTS PLMN in accordance with the present invention.

Referring now in specific detail to the drawings in which like reference numerals identify similar or identical elements throughout the several views, and initially to FIG. 1, a system architecture 10 for integrating voice, data, video and other services over wireless/radio networks is shown. System architecture 10 is presented as an exemplary WLAN-UMTS environment for employing the inventive method and system in accordance with the present invention. Details of the individual block components making up the system architecture which are known to skilled artisans will only be described in details sufficient for an understanding of the present invention.

The present invention is illustratively described in terms of a UMTS network 12 and a WLAN wireless network 14 (e.g., IEEE 802.11 (a, b, e, g) and HIPERLAN2 standards may be employed by these networks). UMTS mobile network 12 (e.g., a third generation (3G) network) communicates with a radio access network (RAN) 8 which comprises a Node B 11 and Radio Network Controller (RNC) 9. WLAN (14) is preferably connected to UMTS network (12) through an intra-PLMN (Public Mobile Land Network) interface. The RAN 8 in turn is attached to a Core Network (CN) 13 which comprises packet based services such as a SGSN (Serving GPRS Support Node) 28, circuit based services, such as a MSC (Mobile Switching Center) 21 and gateways to other PLMNs, such as GGSN (Gateway GPRS Support Nodes) 24. Core network 13 supports connections/interfaces with public switched telephone networks (PSTN) 5 and the Internet 7.

Other components may be included in a core network 13. For example, a home location register 50 may be provided which stores the home locations of mobile stations (MS) 40. By the present invention, network 12 (e.g., a PLMN) is interfaced to a wireless LAN 14 through a Gn (or Gp) interface by employing an interworking function 25. MS 40 connects at an access point 30, and MS 40 is seamlessly switched between WLAN 14 and UMTS 12 in accordance with the present invention when MS 40 roams between the radio access networks.

Figure 3:
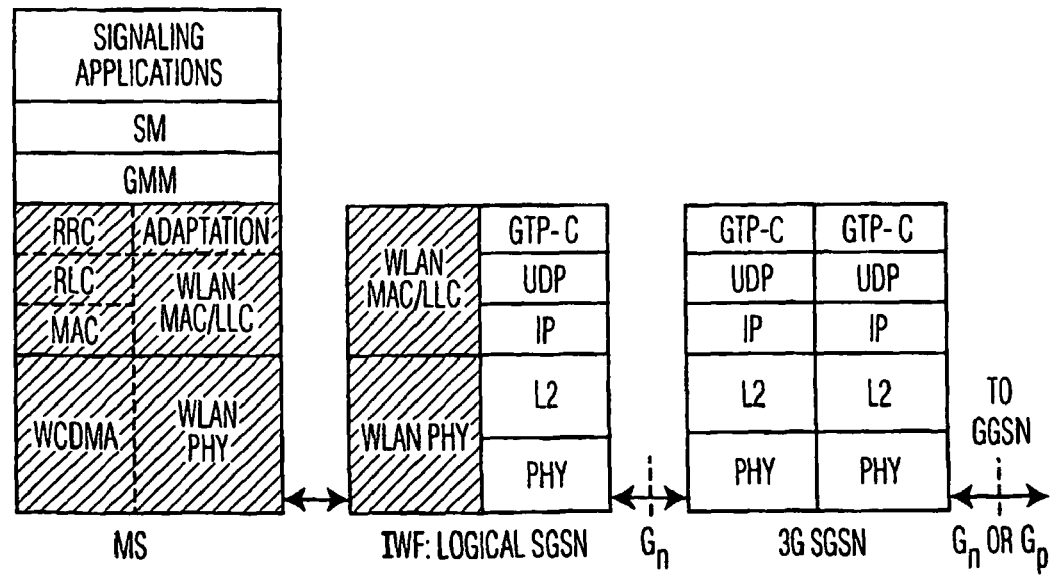
FIG. 3 is a control protocol stack diagram showing an interworking function interface which creates protocol compatibility between a WLAN mobile station and a UMTS SGSN in accordance with one embodiment of the present invention.
Figure 4:
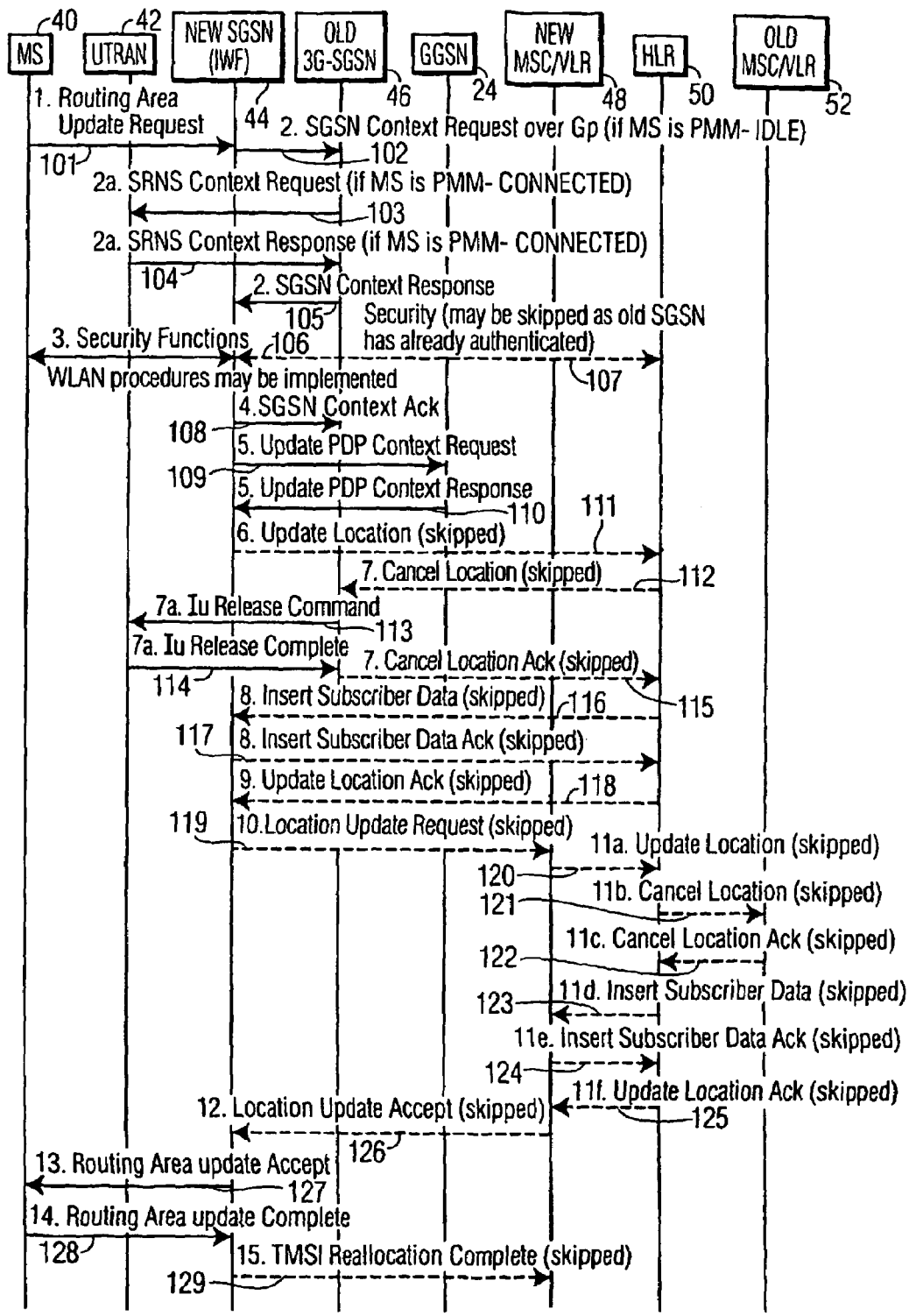
FIG. 4 is an illustrative diagram showing a routing area change between a WLAN and a UMTS PLMN in accordance with one embodiment of the present invention.

WLAN interworking function (IWF) 25 bypasses the RNC 9 and connects to SGSN 28 (assuming packet switched (PS) services). The GGSN 24 takes care of the mobility for packet data, but the IWF 25 will need to communicate with the SGSN 28 to provide the mobility for the handoff between the two physical layer interfaces of network 12 and 14. This can be achieved by implementing the Gn interface between the IWF 25 and the SGSN 28 as shown in FIGS. 3 and 4. The 3G SGSN 28 then sees the IWF 25 as a logical SGSN or pseudo-SGSN.

The SGSN-GGSN portion may become a bottleneck in handling high data rate WLAN hotspots. In that case, another option may be that a GPRS tunneling protocol (GTP) tunnel 31 between GGSN 24 and IWF 25 is used only for downlink traffic coming from the GGSN 24 for user equipment (UE) at MS 40. For all other traffic, the WLAN 14 provides a common Internet access to the UE. This reduces the traffic through the SGSN-GGSN.

The WLAN 14 includes a plurality of access points 30 which are provided to permit wireless user equipment (UE) or mobile stations (MS) to access and use the WLAN. By the present invention, the IWF 25 interacts with the UMTS network 12 over the Gn interface as another 'logical' SGSN in a similar fashion as when UMTS SGSNs communicate via the Gn interface. In this way, the UMTS network 12 interfaces through IWF 25 in a WLAN environment as though the IWF 25 were an SGSN.

Figure 2:
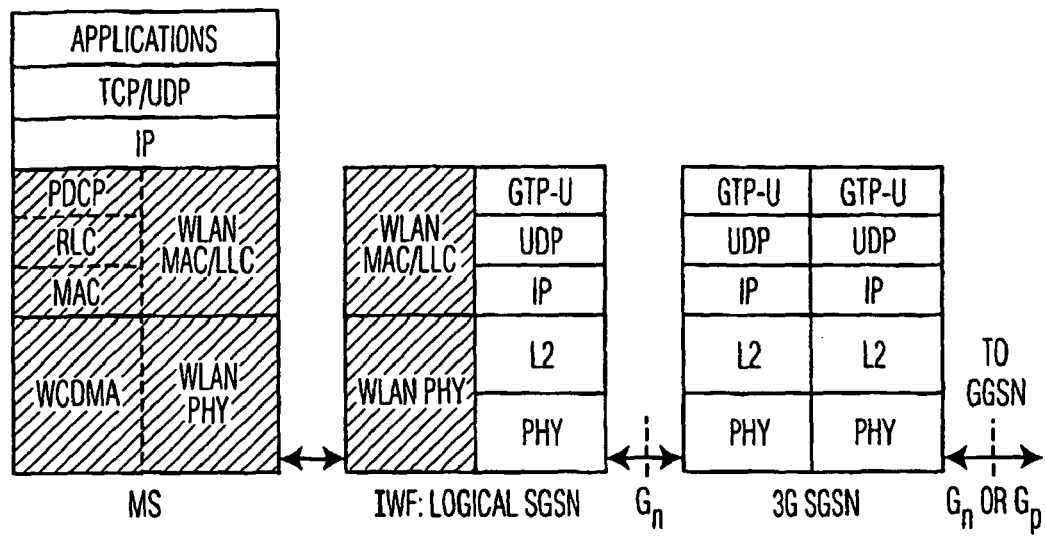
FIG. 2 is a user protocol stack diagram showing an interworking function interface, which creates protocol compatibility between a WLAN mobile station and a UMTS SGSN in accordance with one embodiment of the present invention.

Referring to FIGS. 2 and 3, a user plane stack and a control plane stack for a dual protocol stack for architecture 10 of FIG. 1 are illustratively shown. A logical SGSN or pseudo-SGSN is provided by IWF 25 to act as an interface. In this way, a mobile station (MS) 40 associated with a WLAN may interface with a SGSN 28 associated with a 3G UMTS PLMN 12 in accordance with the present invention. It is to be understood that the protocol stacks may be modified according to specific applications and roaming agreement (including security features) and the stacks shown are illustrative and for the purpose of demonstrating a particularly useful embodiment of the present invention. FIG. 2 illustrates user (data) plane stack protocol while FIG. 3 illustrates control signaling stack protocol.

As one skilled in the art would understand, the user plane stack of MS 40 in FIG. 2 has a dual stack (WLAN and UMTS) which includes an Applications layer, a transmission control protocol/user datagram protocol (TCP/UDP) layer, an Internet protocol layer (IP), a WLAN medium access control/logical link control (MAC/LLC) layer and the WLAN physical layer; the UMTS part also includes the packet data convergence protocol (PDCP), radio link control (RLC) and MAC layers, and a WCDMA physical layer (PHY). The IWF 25 transfers any data/information received from the mobile over the WLAN interface to the UMTS network over an interface compatible with an SGSN of a 3G UMTS system. For example, the data received over WLAN MAC/LLC is transferred to the UMTS SGSN 28 by IWF 25 over a gateway tunneling protocol for the user plane (GTP-U), UDP and an IP. Similar conversion is performed in the control plane. As one skilled in the art would understand, the control plane stack of MS 40 in FIG. 3 includes a Signaling Applications layer, a session management layer (SM), a GPRS mobile management layer (GMM); an RRC (Radio Resource Control) layer, a RLC/MAC layer and the UMTS physical layer for the UMTS interface; and over the WLAN interface: an adaptation layer for radio resource control (RRC) a WLAN MAC/LLC layer and a WLAN PHY layer. The adaptation layer (AL) in the MS 40 mimics the interface functions that correspond to the RRC service. This is necessary to reuse the session management (SM) and GPRS mobility management (GMM) layers of the 3G mobile stack even in WLAN. The IWF adaptation layer (AL) might play the role of a light RRC and transfer any control signaling information (SM/GMM messages) from the MS 40 received over the WLAN MAC/LLC layers to SGSN 28 over a protocol compatible with an SGSN of a 3G UMTS system and vice versa. As before, IWF 25 transfers SM/MM signaling over the Gn interface to the 3G SGSN, and may be employed as though stack were native to the 3G network.

The present invention provides at least the following advantages. The quality of service (QoS) negotiation, mobility, AAA procedures of the 3G network are employed making the entire system more efficient from the standpoint of increased bandwidth, quality and compatibility. The present invention can work with any system (GPRS/CDMA 2000) that can interwork with WLANs.

Advantageously, deployed WLANs, in accordance with the present invention, provide needed bandwidth to maintain QoS for all users. In addition, WLAN radio resources may be used in the WLAN PLMN to free up radio resources of the 3G RAT that a user is moving out of. Communication between the UMTS network and WLAN of the present invention is seamless by employing an IWF to create compatible protocols and information exchange.

Referring to FIG. 4, a diagram showing interactions between entities in a routing area change scenario are illustratively shown in accordance with one example embodiment of the present invention. The diagram shows a mobile station (MS) 40, a UMTS Terrestrial Radio Access Network (UTRAN) 42, a new IWF-SGSN 44 (created to employ the resources of a WLAN), an old 3G-SGSN 46, a GGSN 24, a new mobile switching center/visitor location register (MSC/VLR) 48, a home location register (HLR) 50 and an old MSC/VLR 52. In this scenario, MS is moving into a high traffic area (hot spot) where a UMTS network's resources are heavily loaded. The system employs the WLAN (IWF) to more efficiently use the resources of the UMTS network by supplementing its capabilities with the WLAN. The IWF is referred to as IWF 25 (FIG. 1), and the IWF-SGSN 44 (FIG. 4) is employed to indicate the system's interface location. These terms are synonymous and may be readily interchanged.

In step 101, a routing area update request is made by MS 40 to the IWF-SGSN 44. If MS is in packet mobility management (PMM) idle, IWF-SGSN 44 makes a context request over the Gn interface to old 3G SSGN 46 in step 102. If in idle mode, SGSN 46 provides a context response to IWF-SGSN 44 in step 105. If MS 40 is in a PMM (Packet Mobility Management) connected mode, an SRNS (Serving Radio Network Subsystem) context response is made to UTRAN 42 in step 103 and a response is sent back to 3G-SGSN 46 in step 104.

Security functions may be handled between MS 40 and IWF-SGSN 44 in step 106. WLAN procedures may be employed here. Additional security procedures may be provided in step 107 to authenticate the new IWF-SGSN 44. These security measures are optional since authentication of the old SGSN 46 may preclude the need to re-authenticate the new IWF-SGSN 44. In step 108, a context acknowledgement is sent from IWF-SGSN 44 to SGSN 46. In step 109, IWF-SGSN 44 sends an update packet data protocol (PDP) context request to GGSN 24, which updates its PDP context fields and responds with an update PDP context response in step 110. Thus, the GTP (user and control plane) tunnels are established between the GGSN and IWF-SGSN 44 for subsequent data/signaling transfer between the WLAN and UMTS networks.

In steps 111-120, the new SGSN (IWF 25) 44 informs the HLR 50 of the change of SGSN by sending Update Location (SGSN Number, SGSN Address, and International Mobile Subscriber Identification (IMSI)) to the HLR 50. Requests, responses and acknowledgements are performed. Steps 111 and 114 perform a Iu (interface between RNC and SGSN) release sequence when MS 40 sends an explicit signaling connection release to UTRAN 42 upon being validated by the old SGSN 46 in steps 102-105 depending on a Packet Mobility Management (PMM) state of MS 40. A similar procedure is performed to update location in the visitors location register VLR between an old VLR/MSC 52 and a new VLR/MSC 48. Steps 120-125 provide this update sequence.

The new SGSN (IWF) 44 may not implement a Gr interface (an interface between an HLR and an SGSN) with HLR 50 and so (to reduce the complexity of the IWF), in this case, steps 111-126 and 129 may be skipped. In step 126, a location update accept is sent to IWF SGSN 44 from the new VLR/MSC 48. The routing area change is updated, accepted in step 127 and completed in step 128. In step 129, PTMSI (Packet Temporary Mobile Subscriber Identity) reallocation may be performed and completed if needed.

The method as described with reference to FIG. 4 illustratively describes the following scenarios.

Mobility

1. UMTS to WLAN Entry

If the UMTS SGSN covers one routing area (RA) and the WLAN coverage area is another RA, the WLAN IWF can broadcast the new routing area identifier (RAI) (pre-allocated by the UMTS network). By comparing the RAI stored in user equipment (UE) or mobile station (MS) in GPRS Mobile Management (GMM) context with the RAI received from the IWF, the MS or UE detects that an RA update (inter-SGSN) needs to be performed. The procedure is described with reference to FIG. 4. For an Inter-SGSN RA update, the new SGSN (IWF) informs the HLR of the change of SGSN by sending Update Location (SGSN Number, SGSN Address, and International Mobile Subscriber Identification (IMSI)) to the HLR. Three scenarios are illustratively described below:

Case 1: The IWF 25 may employ a Gr interface with the HLR 50 in which case all the steps in FIG. 4 may be followed.

Case 2: The new SGSN (IWF) 44 does not implement the Gr interface towards HLR 50 and so step 111 of sending location update to the HLR 50 by the IWF 25 along with steps 112, 115-126 and 129 are skipped. The Iu release sequence in steps 113 and 114 happen when the MS/UE 40 sends an explicit signaling connection release to the UTRAN 42 upon being validated by the old SGSN 46 in steps 102/105 or steps 103/104 depending on the PMM state of the UE. Since the GGSN 24 is updated with the new SGSN (IWF) 44 through an update PDP context request/response, the UE's PDP context is updated within step 109/110. All the uplink and downlink packets shall now be sent conveniently between GGSN 24 and IWF 44 and the skipping of the HLR location update will not cause any problems.

Case 3: IP based Diameter authentication from a HSS (Home Subscriber Server) may be implemented between an IWF 25 and HLR 50 in the future and standard procedures for inter-SGSN relocation can transpire.

2. WLAN to UMTS Entry

Upon re-entry into the UMTS network, the UE again performs an inter-SGSN routing area update and repeats the method of FIG. 4, except that this time the new SGSN is the UMTS SGSN while the old SGSN are the IWF. 3G security procedures are preferably implemented to re-validate the UE when it goes back to the UMTS network. Since going into the WLAN, the IWF may not have updated the HLR and the UMTS SGSN marked in its context that a Mobile Switching Center (MSC)/Visitor Location Register (VLR) association, the information in the GGSNs and the HLR are invalid, when the MS initiates a routing area update procedure back to the UMTS SGSN, it triggers the MSC/VLR, the GGSNs, and the HLR information in the UMTS SGSN to be updated/validated.

Again, the three cases mentioned above are employed to illustrate different scenarios:

Case 1: The IWF 25 may employ a Gr interface with the HLR 50 in which case all the steps in FIG. 4 may be followed.

Case 2: Since while going into the WLAN, the IWF 25 had not updated the HLR 50 and the UMTS SGSN 46 marked in its context that the MSC/VLR 52 association and the information in the GGSNs 24 and the HLR 50 as invalid, when the MS 40 initiates a routing area update procedure back to the UMTS SGSN 46, it triggers the MSC/VLR 52, the GGSNs 24, and the HLR 50 information in the UMTS SGSN 46 to be updated/validated.

Case 3: IP based Diameter authentication from the HSS may be implemented between an IWF and HLR in the future and standard procedures for inter-SGSN relocation can transpire.

Security

It is assumed that an MS has been authenticated by the UMTS network before it moves into a WLAN coverage area. The IWF 25 will implement 3G procedures to authenticate the UE. In steps 102/105 in FIG. 4, if the MS 40 was in PMM-IDLE state, the IWF (new SGSN) 44 sends an SGSN Context Request message (old P-TMSI, old RAI, old P-TMSI Signature) to the old SGSN 46 to get the mobility management (MM) and packet data protocol (PDP) contexts for the MS 40. The old SGSN 46 validates the old P-TMSI Signature and responds with an appropriate error if the signature does not match the value stored in the old SGSN 46. The IWF 25 can be attached to the 3G intra-PLMN backbone and need not re-authenticate the UE 40 with the HLR 50 upon entering the WLAN 14 if the old SGSN 46 validates the UE 40. The UE 40 in PMM-CONNECTED state entails the sending of a Relocation Command message to the source SRNC by the old SGSN 46 followed by a Forward SRNS Context (RAB Contexts) message to the new SGSN (IWF) 44 via the old SGSN 46, which is again a validation of the UE 40 by the UMTS SGSN 46.

However WLAN security procedures should be implemented so that the MS 40 sends ciphered P-TMSI, old RAI, old P-TMSI Signature, and other parameters to the IWF (new SGSN) 44, which can then send them to the old 3G SGSN 46.

The IWF has interfaces towards both WLAN and UMTS networks. It listens to the mobile's data and signaling on the WLAN interface (if co-located with Access Point) and forwards the relevant signaling (SM/GMM related) and data to the 3G SGSN over the Gn interface. However only limited functionality of a UMTS SGSN actually needs to be incorporated in the IWF. More specifically, the IWF would need only the Gn interface towards the 3G SGSN/GGSN. Other SGSN interfaces such as Gr etc. need not be implemented in the IWF making it simple. The Gn interface helps the IWF to do session management, mobility management and AAA functions by reusing the 3G procedures. The mobile's adaptation layer sends the SM/GMM signaling over the WLAN interface to the IWF adaptation layer which then sends out the SM/GMM messages to the 3G SGSN/GGSN over the Gn interface.

Thus, the present invention preferably maintains mobility and AAA procedures of the 3G network. The service provider needs only one point of attachment to serve the 3G network as well as the connected WLANs helping the provider retain tight control over the customer base in the WLAN as well. The simple IP-based Gn interface of the SGSN may be implemented in the IWF towards the SGSN making the present invention scalable. As described earlier, the other complex SGSN interfaces such as Gr (towards HLR) etc. can be skipped. The PDP addresses are still allocated by the same GGSN while the terminal (MS) is in the WLAN making MM easier.

In present UMTS networks, the data is encapsulated using GTP-U from GGSN to SGSN and then again from SGSN to RNC requiring more processing time. The present invention also has the advantage that the dual GTP encapsulation as in the UMTS network (GGSN-SGSN and then SGSN-RNC) is avoided since only the GGSN-IWF encapsulation part is done in the WLAN coverage area as the data is forwarded from the GGSN directly to the IWF and vice versa as shown in FIG. 1). Advantageously, no modifications to the existing UMTS network nodes are required for the interworking architecture of the present invention. Still further advantages include using an RA update timer that can be set to a large value upon the MS entering the WLAN RA so that frequent RAUs are avoided resulting in conservation of battery power. In addition, WLAN radio resources are preferably used in the WLAN coverage area freeing up the radio resources of the RAT (3G) that the UE is moving from into the WLAN.

The present invention provides a dual stacked mobile and an IWF which employ an adaptation layer (AL), which enables the ability to use existing SM/GMM procedures from the mobile to the 3G SGSN for Session and Mobility management. This advantageously provides seamless handover between two networks. Re-use of the mobility management, session management, authentication scheme specified in a UMTS system when a user moves into a WLAN coverage area guarantees the service level be maintained during user's handover.

Having described preferred embodiments for wireless local area network (WLAN) as a logical serving GPRS (general packet radio service) support node (SGSN) for WLAN/universal mobile telecommunications system (UMTS) interworking (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An interface for connecting networks, comprising:
an interworking function provided between a wireless local area network (WLAN) and a public mobile land network (PLMN) to provide communication interactions between the public mobile land network and the wireless local area network;
the interworking function further comprising a dual-protocol stack which interfaces the wireless local area network protocols and public mobile land network protocols to provide seamless communications between the wireless local area network and the public mobile land network such that an increase in available service bandwidth provided for users of the public mobile land network is maintained; and
means for detecting user movement between a coverage area of said wireless local area network and a coverage area of said public mobile land network by comparing a first routing area identifier (RAI) associated with said public mobile land network and a second routing area identifier (RAI) associated with said wireless local area network.

2. The interface as recited in claim 1, wherein the interworking function is present within the wireless local area network.

3. The interface as recited in claim 1, wherein the public mobile land network includes one of a universal mobile telecommunications system (UMTS) and a general packet radio service (GPRS) system.

4. The interface as recited in claim 1, wherein the interworking function communicates between the wireless local area network and the public mobile land network through a Gn interface.

5. The interface as recited in claim 1, wherein the seamless communications include protocol compatibility between the wireless local area network and the public mobile land network.

6. The interface as recited in claim 1, wherein the interworking function functions as a logical serving general packet radio service (GPRS) support node (SGSN).

7. The interface as recited in claim 6, wherein the interworking function is viewed by the public mobile land network as a logical serving general packet radio service support node within its own network.

8. The interface as recited in claim 6, wherein the interworking function is viewed as a node within the wireless local area network by the wireless local area network when receiving information from the public mobile land network.

9. The interface as recited in claim 1, wherein the interworking function is coupled to a gateway general packet radio service support node (GGSN) via a gateway tunneling protocol (GTP) tunnel.

10. The interface as recited in claim 1, wherein the protocol stack includes a user plane stack.

11. The interface as recited in claim 1, wherein the protocol stack includes a control plane stack.

12. The interface as recited in claim 1, wherein the public mobile land network includes session management general packet radio service mobility management (GMM) procedures which are reused in the wireless local area network due to the use of an adaptation layer in a mobile dual-protocol stack and in the interworking function to wireless local area network interface to mimic the functionality of a radio resource control (RRC) protocol sublayer.

13. The interface as recited in claim 1, wherein the wireless local area network works with any serving general packet radio service (GPRS) or code division multiple access (CDMA) system.

14. A method for interfacing two wireless networks, comprising the steps of:
connecting a wireless local area network (WLAN) to a universal mobile telecommunications system (UMTS) network through an intra public mobile land network (PLMN) interface; and
interfacing the wireless local area network to the universal mobile telecommunications system network by providing interfaces towards the universal mobile telecommunications system and the wireless local area network using an interworking function such that communications received from the wireless local area network appear to be from a different serving general packet radio service (GPRS) support node (SGSN) and communications sent to the wireless local area network appear to be from within the wireless local area network, and
detecting user movement between a coverage area of said wireless local area network and a coverage area of said public mobile land network by comparing a first routing area identifier (RAI) associated with said public mobile land network and a second routing area identifier (RAI) associated with said wireless local area network.

15. The method as recited in claim 14, wherein the interworking function communicates with a serving general packet radio service (GPRS) support node (SGSN) of the universal mobile telecommunications system network through a Gn interface.

16. The method as recited in claim 14, wherein the interworking function creates seamless interactions between the universal mobile telecommunications system network and wireless local area network by ensuring protocol compatibility between the wireless local area network and the universal mobile telecommunications system network.

17. The method as recited in claim 14, wherein the interworking function functions as a logical serving general packet radio service (GPRS) support node (SGSN).

18. The method as recited in claim 14, further comprising the step of viewing the interworking function as a logical serving general packet radio service support node from a same public mobile land network.

* * * * *